United States Patent [19]
Huberty et al.

[11] Patent Number: 5,605,222
[45] Date of Patent: Feb. 25, 1997

[54] DUAL KNIFE EDGE TRANSFER CONVEYOR

[75] Inventors: Jay C. Huberty, Centerville; Mark A. Rekucki, Blaine; Thomas M. Sorensen, White Bear Lake, all of Minn.

[73] Assignee: Illinois Tool Works Inc., Glenview, Ill.

[21] Appl. No.: 636,950

[22] Filed: Apr. 24, 1996

[51] Int. Cl.⁶ .................................................. B65G 15/00
[52] U.S. Cl. ........................................... 198/841; 198/600
[58] Field of Search ..................................... 198/496, 600, 198/840, 841

[56] References Cited

U.S. PATENT DOCUMENTS

| | | | |
|---|---|---|---|
| 2,517,983 | 8/1950 | Crosland | 198/600 X |
| 4,194,300 | 3/1980 | Swanson et al. | 34/217 |
| 4,206,994 | 6/1980 | Silverberg et al. | 198/841 X |
| 4,288,208 | 9/1981 | Kusters | 425/371 |
| 4,697,689 | 10/1987 | Carrell | 198/394 |
| 4,697,690 | 10/1987 | Minnetti | 198/395 |
| 4,795,020 | 1/1989 | Carter et al. | 198/370 |
| 4,938,336 | 7/1990 | Aquino et al. | 298/369 |
| 4,986,408 | 1/1991 | Carter et al. | 198/368 |
| 5,044,485 | 9/1991 | Loder | 198/841 X |
| 5,156,260 | 10/1992 | Dorner et al. | 198/841 X |

*Primary Examiner*—James R. Bidwell
*Attorney, Agent, or Firm*—Thomas W. Buckman; John P. O'Brien; Mark W. Croll

[57] ABSTRACT

A dual knife-edge transfer conveyor for transporting small articles from one conveyor to a second conveyor, upper sections of the conveyors being in approximately the same plane, the conveyors being driven in the same transport direction and following each other immediately in the transport direction and thus forming a gap between the two conveyors, the dual knife-edge transfer conveyor comprising: a dual knife-edge plate member, an endless transfer belt, the transfer belt revolving about the dual knife-edge plate member, a transfer conveyor frame, the dual knife-edge plate member being attached to an upper section of the frame, the dual knife-edge plate member also having a pair of edges, each of the edges having a small radius, the frame being positioned in between the two conveyors such that the dual knife-edge plate member lies in approximately the same plane as the two conveyors, the dual knife-edge plate member further having a length slightly smaller than the gap formed between the two conveyors, deflection rollers, the deflection rollers being attached to the frame below the dual knife-edge plate member for deflecting the transfer belt around the edges of the dual knife-edge plate member inwardly and away from the two conveyors at an angle less than 90 degrees to enable the transfer belt to snugly fit within the gap created by the two conveyors without the transfer belt touching the two conveyors, and a drive for driving the transfer belt in the same transport direction as the two conveyors.

7 Claims, 3 Drawing Sheets

DUAL KNIFE EDGE TRANSFER CONVEYOR

BACKGROUND OF THE INVENTION

This invention relates to improvements in transferring materials from one conveyor to another conveyor and more particularly to transferring small articles across the gap generated between typical conveyors.

Generally conveyors are typically driven by pulleys and the extremity of each conveyor is defined as the radius of the pulley. If one conveyor is to transfer small parts to another conveyor, it typically does so by dropping the parts from one conveyor to the next. This method, however, is not always desirable since the small parts may require a smooth transition between conveyors. Furthermore, if the two conveyor pulleys were to be placed end to end, a fairly large gap between the tangential areas at the top faces of the belts would exist and thereby making it impossible to transfer small articles from one conveyor to another conveyor in approximately the same plane.

Another method of transferring small articles from one conveyor to the next is using non-movable dead plate spacers. Such non-movable dead plates may be adequate to transfer large articles between conveyor belts, however, such spacers would not adequately transfer smaller articles. Yet another method concerns using a liquid medium sealed in between the conveyor belts. This method requires that the liquid be of a higher specific gravity than the articles to be transported, therefore articles having a higher specific gravity than the liquid would not be adequately or smoothly transferred.

It is therefore an object of the present invention to provide a moving transitional transfer conveyor for smoothly transporting small articles from one conveyor to a second conveyor without dropping the parts and/or changing the part orientation, and without allowing the parts to fall within a gap created between the two conveyors.

SUMMARY OF THE INVENTION

The preferred embodiment of the present invention is a belt arrangement including two endless conveyor belts revolving about deflection rollers for transporting small articles, upper sections of the conveyor belts being in approximately the same plane, the conveyor belts are driven in the same transport direction and follow each other immediately in the transport direction and thus form a gap between the two conveyor belts; and a transfer device for transferring articles from one conveyor belt to a second conveyor belt, an improved transfer device comprising a dual knife-edge transfer conveyor, the dual knife-edge transfer conveyor comprising: a dual knife-edge plate member, an endless transfer belt, the transfer belt revolving about the dual knife-edge plate member, a transfer conveyor frame, the dual knife-edge plate member being attached to an upper section of the frame, the dual knife-edge plate member also having a pair of edges, each of the edges having a small radius, the frame being positioned in between the two conveyors such that the dual knife-edge plate member lies in approximately the same plane as the two conveyors with one edge facing one conveyor and the second edge facing the second conveyor, the dual knife-edge plate member further having a length slightly smaller than the gap formed between the two conveyors, deflection means, the deflection means being attached to the frame below the dual knife-edge plate member for deflecting the transfer belt around the edges of the dual knife-edge plate inwardly and away from the two conveyors at an angle less than 90 degrees to enable the transfer belt to snugly fit within the gap created by the two conveyors without the transfer belt touching the two conveyors, drive means, the drive means being attached to the frame below the deflection means for driving the transfer belt in the same transport direction as the two conveyors, and a deflection pulley, the deflection pulley being attached to a lower section of the frame and deflecting the transfer belt back up to the dual knife-edge plate member.

Another feature of the present invention concerns the dual knife-edge transfer conveyor described above, wherein the transfer belt comprises at least one belt.

Still another feature of the present invention concerns the dual knife-edge transfer conveyor described above, wherein the transfer conveyor further includes at least one U-shaped guide pan, the guide pan having an inner width equivalent to the width of the belt, the guide pan is attached to the frame below the dual knife-edge plate wherein the belt is guided through the corresponding U-shaped guide pan thereby keeping the belt in its respective location.

Still yet another feature of the present invention concerns the dual knife-edge transfer conveyor described above, wherein the dual knife-edge plate member comprises a flat plate and a pair of knife edge guides, each of the knife edge guides being attached at opposing edges of the flat plate along the width of the flat plate, each of the knife edge guides having a flat upper portion that extends a short distance beyond the edges of the flat plate and lies in the same horizontal plane as the flat plate, the knife edge guides further having a small radius at an outer edge thereof for allowing the transfer belt to deflect around.

According to important features of the present invention concerning the dual knife-edge transfer conveyor there is also provided a rotating circular cleaning brush, the cleaning brush is attached to the conveyor frame below a deflection pulley wherein bristles of the cleaning brush rotate in a direction opposite to the direction of the transfer belt and come into contact with the transfer belt thereby cleaning the transfer belt of any material deposited thereon.

Yet another feature of the present invention concerns the dual knife-edge transfer conveyor described above, wherein the transfer belt comprises a thin flexible material such as polyester.

DETAILED DESCRIPTION OF PREFERRED EMBODIMENTS

Figure 1:
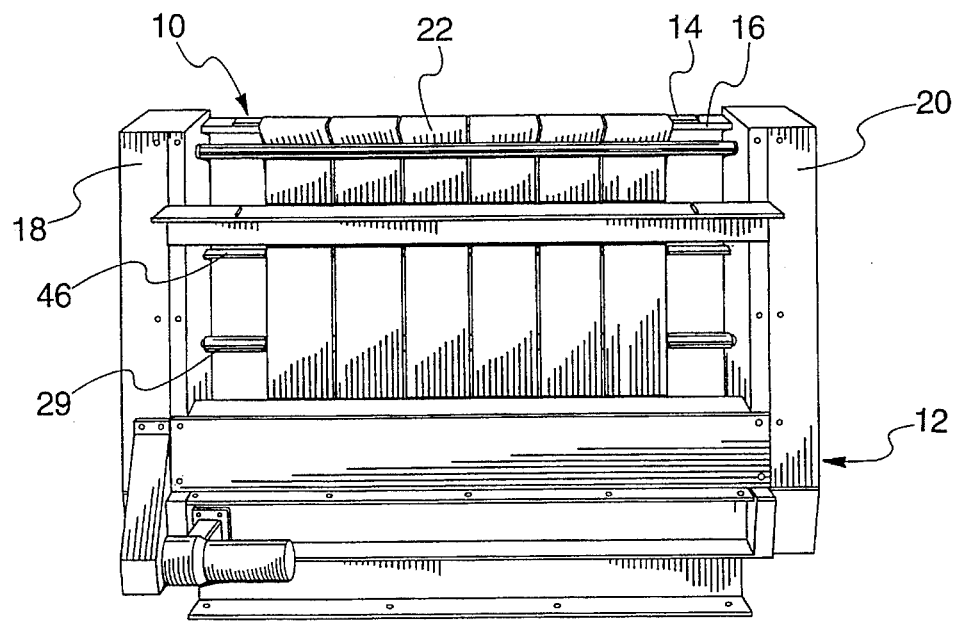
FIG. 1 is a perspective view of the front side of the dual knife edge transfer conveyor.

Referring now to FIG. 1 there is shown a dual knife-edge transfer conveyor 10 for transferring small articles smoothly from one conveyor to another. The transfer conveyor 10 includes a conveyor frame 12. The conveyor frame 12 holds a rectangular dual knife-edge plate 14 at an upper section of the frame 12. The dual knife-edge plate is further supported on a horizontal dead plate 16 located between two support arms 18, 20 on the frame. A single belt or a plurality of transfer belts 22 can be used to transfer articles between in-feed and out-feed conveyors. In-feed and out-feed conveyors can consist of a variety of different types of conveyors including: belt, slat, chain, or rollers.

Figure 2:
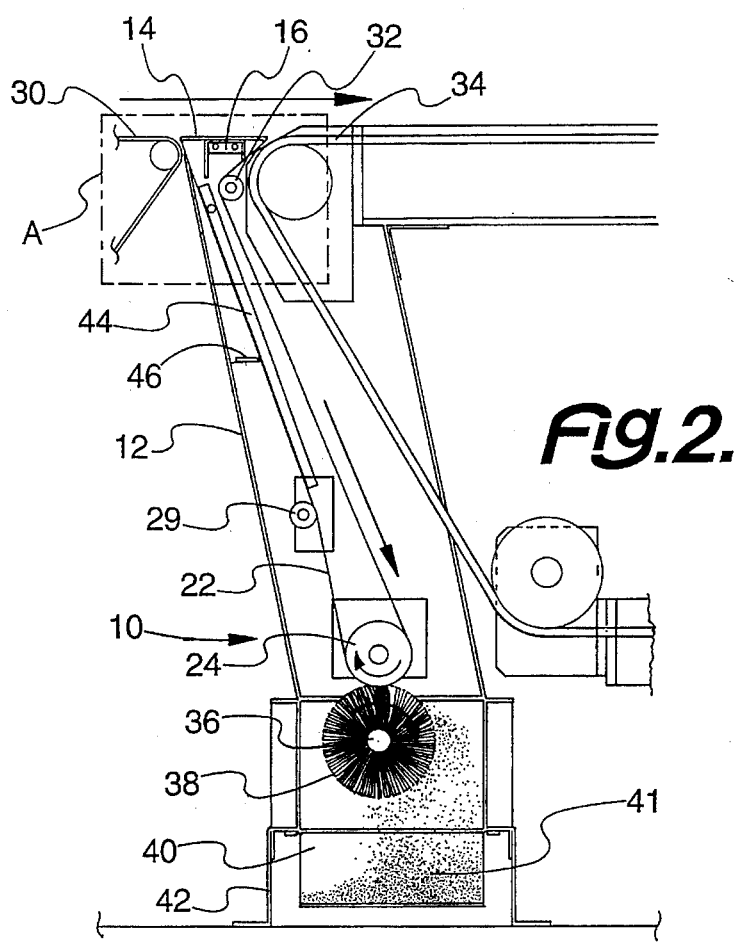
FIG. 2 is a cross-sectional side view of the dual knife edge transfer conveyor embodying important features of the invention.

FIG. 2 illustrates the transfer belts 22 snugly wrapped around the dual knife-edge plate 14. The transfer belts are endless and extend downwardly around a drive pulley 24. The transfer belts are made of a flexible, thin material. Excellent results can be obtained using a belt made of polyester. The drive pulley deflects the transfer belt 22 to the dual knife-edge plate 14. The drive pulley 24 is powered and drives the transfer belt about the dual knife-edge plate and around the drive pulley.

Figure 3:
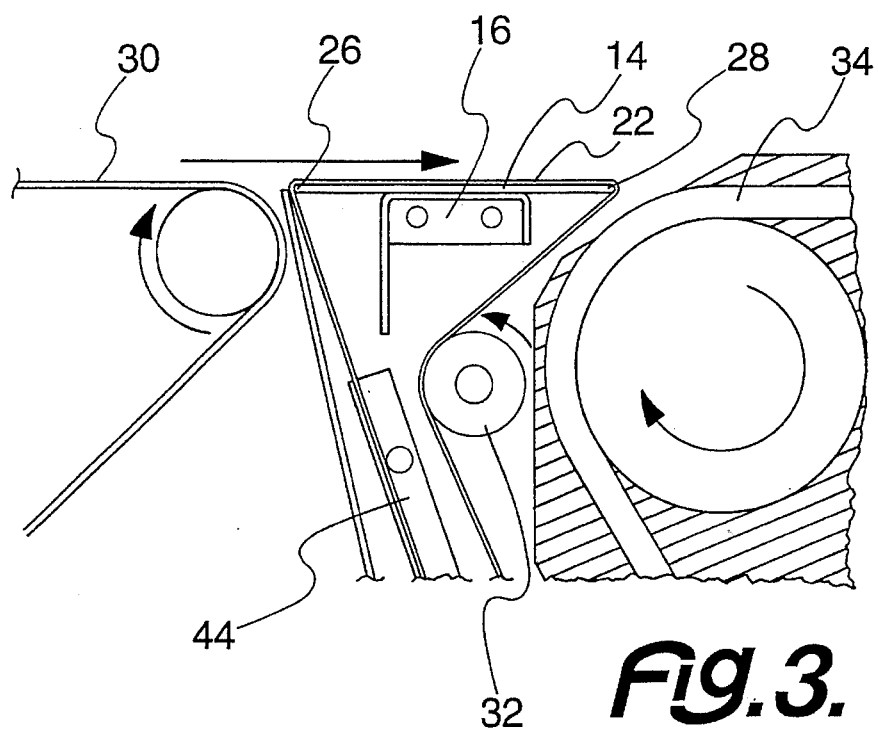
FIG. 3 is an enlarged view of the boxed area A in FIG. 2.

As can be seen in greater detail in FIG. 3, the dual knife-edge plate 14 is a substantially thin and stiff plate having a small radius at each edge 26, 28. The transfer belt 22 is angled due to the position of the drive pulley 24 and a deflection roller 29 (FIG. 2). The transfer belt is angled less than 90 degrees from the dual knife-edge plate and enables the transfer belt to come close to a first conveyor 30 and wrap around the small radius edge 26 of the dual knife-edge plate 14. A deflection pulley 32 deflects the transfer belt inwardly and away from a second conveyor 34 at an angle less than 90 degrees thereby enabling the transfer belt to come close to the second conveyor by wrapping around the small radius edge 28 of the dual knife-edge plate. The direction of travel of the pulleys and the conveyor belts is indicated by the arrows. The dual knife-edge dead plate can be replaced or adjusted to different lengths in order to provide an accurate fit between the two conveyors.

The dual knife-edge plate is positioned in approximately the same plane as the two conveyors with one edge 26 facing the first conveyor 30 and the other edge 28 facing the second conveyor 34. The dual knife-edge plate 14 has a length slightly smaller than the gap formed between the two conveyors, thereby providing a transfer conveyor that is able to smoothly transfer small articles between conveyors.

FIG. 2 further illustrates the use of a rotating circular cleaning brush 36. The cleaning brush is positioned below the drive pulley and rotates in the opposite direction to enable bristles 38 on the cleaning brush to come into contact with and clean the surface of the transfer conveyor 22 adjacent the drive pulley 24 thereby removing any material that might accumulate. A removable collection tray 40 is positioned below the cleaning brush to collect any material 41 that is knocked off of the transfer belt by the cleaning brush. Collected material can be discarded or reclaimed by sliding the collection tray 40 from the base 42 of the transfer conveyor. The collection tray can then be placed back into the base for collecting more material.

Figure 4:
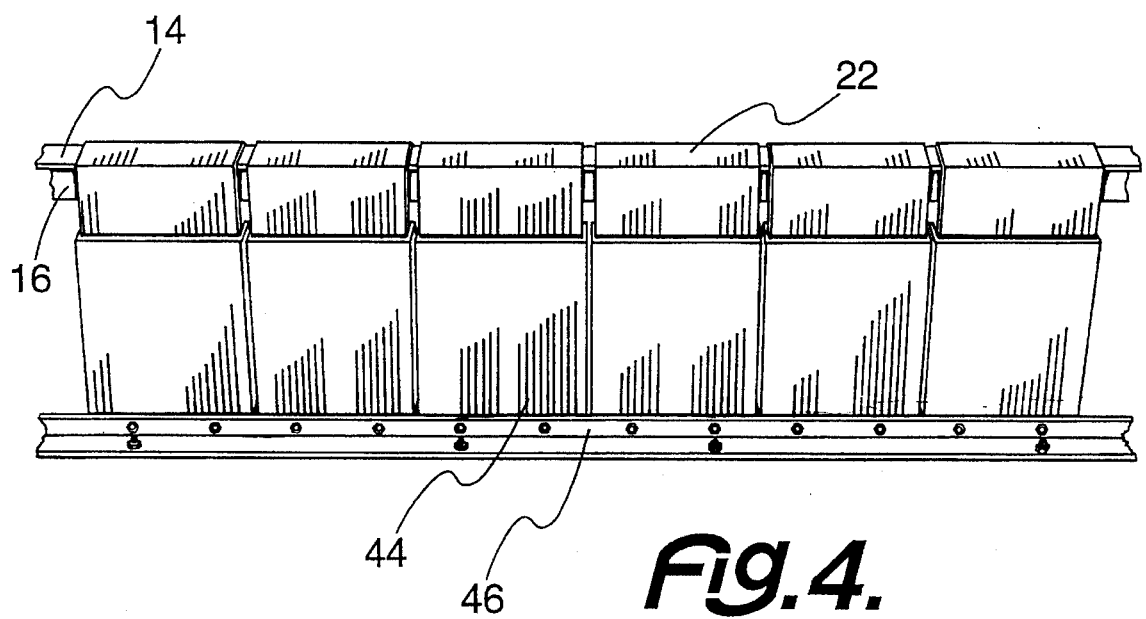
FIG. 4 is a partial perspective view of the back side of the dual knife edge transfer conveyor.

To prevent the transfer belts 22 from tracking across the width of the dual knife-edge plate 14, U-shaped guide pans 44 (FIGS. 2, 4) are provided to keep each belt tracking in its proper location without having to adjust the belts back into their proper location. The U-shaped guide pans are fixed to a beam 46 mounted between the support arms 18, 20. Each of the U-shaped guide pans has an inner width equivalent to the width of each of the transfer belts 22. The transfer belts are then guided within the guide pans and keep the belts in their proper tracking position.

Figure 5:
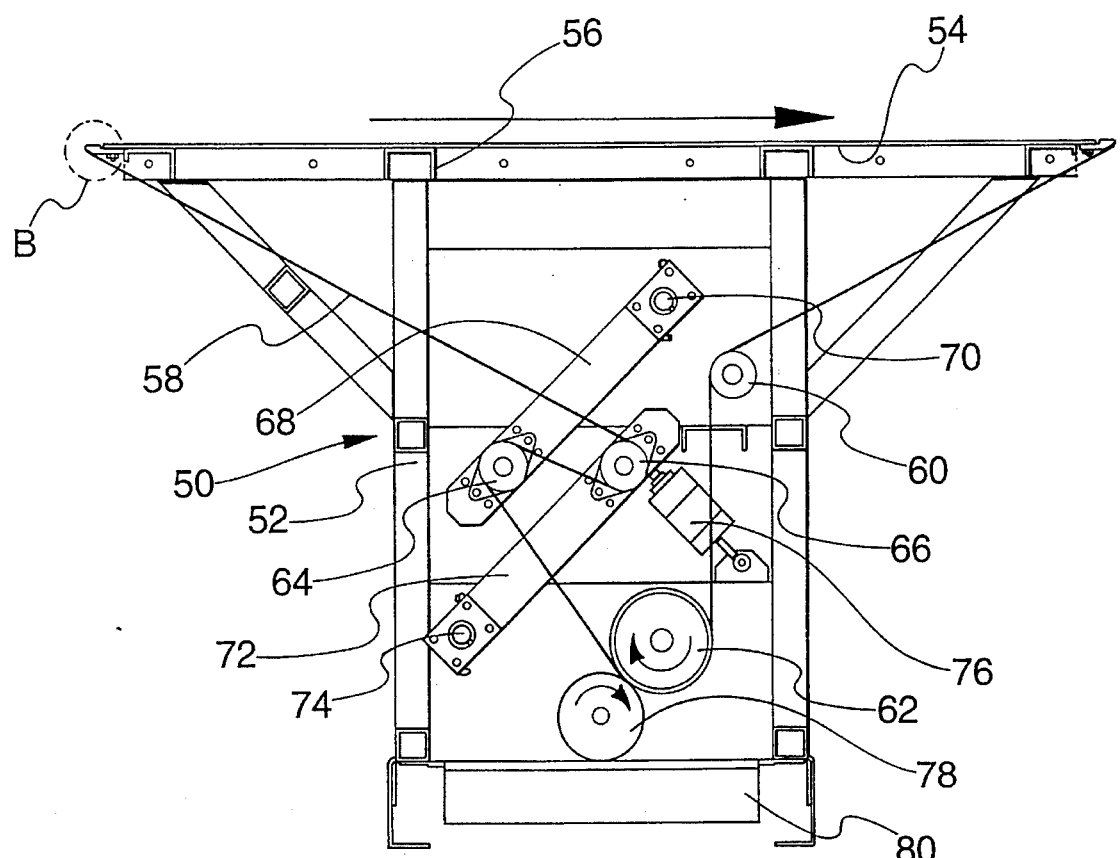
FIG. 5 is a cross-sectional side view of another embodiment of a dual knife edge transfer conveyor.
Figure 6:
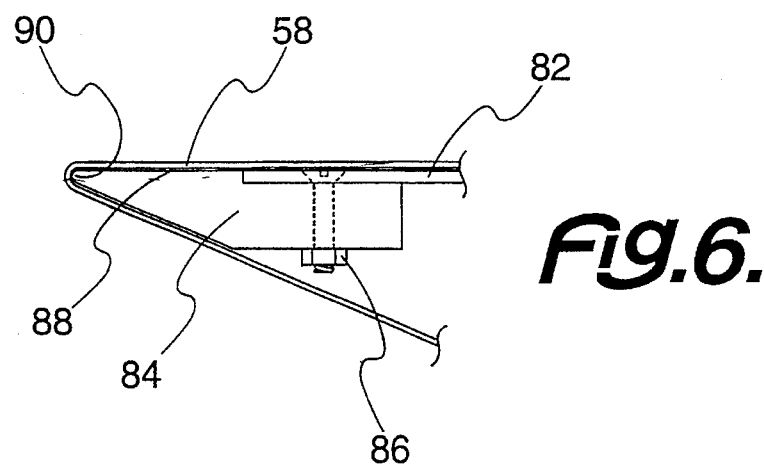
FIG. 6 is an enlarged view of the encircled area B in FIG. 5 embodying important features of the invention.

Another embodiment of the dual-knife edge transfer conveyor is shown in FIGS. 5 and 6. The transfer conveyor 50 includes a conveyor frame 52. The conveyor frame 52 holds a rectangular dual knife-edge plate member 54 at an upper section of the frame. The dual knife-edge plate member is further supported on a horizontal dead plate 56 located at an upper edge on the frame. A single belt 58 can be used to transfer articles between conveyors.

The transfer belt 58 is snugly wrapped around the dual knife-edge plate member 54. The transfer belt is endless and extends downward and inward around a deflection pulley 60 and a drive pulley 62. The drive pulley drives and deflects the transfer belt 58 around a tension pulley 64 and an adjustment pulley 66 to the dual knife-edge plate member 54. The tension pulley 64 is attached to a pair of rotating arms 68 positioned at opposing outer edges of the tension pulley. The rotating arms 68 rotate about a pivot point 70 and can be adjusted to add or decrease tension in the transfer belt. The adjustment pulley 66 is also attached to a pair of opposing rotating arms 72 that rotate about a pivot point 74. The adjustment pulley is controlled by a pair of air tracking cylinders 76 that are attached to the frame of the transfer conveyor at opposing ends of the adjustment pulley. Sensors allow the tracking cylinders 76 to add or decrease tension on either side of the adjustment pulley to keep the transfer belt from tracking off of the transfer conveyor. Various other methods can be employed to keep the belt from tracking off of the transfer conveyor.

Further features of the transfer conveyor include a rotating brush 78 at a lower portion of the transfer conveyor for brushing material off of the transfer belt and a collection tray 80 for collecting material that is brushed off.

As can be seen in greater detail in FIG. 6, the dual knife-edge plate member comprises a flat plate 82 and a pair of knife edge guides 84. Each of the knife edge guides is attached at opposing edges of the flat plate along the width of the flat plate. The knife edge guides can be attached to the flat plate with nuts and bolts 86. Each of the knife edge guides has a flat upper portion 88 that extends a short distance beyond the edges of the flat plate and lies in the same horizontal plane as the flat plate. The knife edge guides have a small radius 90 at an outer edge thereof for allowing the transfer belt 58 to deflect around. The transfer belt is angled less than 90 degrees from both edges of the dual knife-edge plate member and enables the transfer belt to come close to conveyors and wrap around the small radius edges of the dual knife-edge plate member.

Modification to the above described embodiments and methods would be obvious to those of ordinary skill in the art and would not bring the invention so modified beyond the scope of the appended claims.

What is claimed is:

1. In an arrangement including two endless conveyors revolving about deflection rollers for transporting articles, upper sections of said conveyors being in approximately the same plane, said conveyors being driven in the same transport direction and following each other immediately in the transport direction and thus forming a gap between the two conveyors; and a transfer device for transferring articles from a first conveyor to a second conveyor, an improved transfer device comprising a dual knife-edge transfer conveyor, said dual knife-edge transfer conveyor comprising:

a dual knife-edge plate member, an endless transfer belt, said transfer belt revolving about said dual knife-edge plate member, a transfer conveyor frame, said dual knife-edge plate member being attached to an upper section of said frame, said dual knife-edge plate member also having a pair of edges, each of said edges having a small radius, said frame being positioned in between the two conveyors such that said dual knife-edge plate member lies in approximately the same plane as the two conveyors with one edge facing the first conveyor and the second edge facing the second conveyor, said dual knife-edge plate member further having a length slightly smaller than the gap formed between the two conveyors, deflection means, said deflection means being attached to said frame below said dual knife-edge plate member for deflecting said transfer belt around the edges of the dual knife-edge plate member inwardly and away from the two conveyors at an angle less than 90 degrees to enable the transfer belt to snugly fit within the gap created by the two conveyors without the transfer belt touching the two conveyors, drive means, said drive means being attached to said frame below said deflection means for driving said transfer belt in the same transport direction as the two conveyors, and a deflection pulley, said deflection pulley being attached to a lower section of said frame and deflecting said transfer belt back up to said dual knife-edge plate member.

2. The improvement according to claim 1, wherein said transfer belt comprises at least one belt.

3. The improvement according to claim 2, and further including at least one U-shaped guide pan, said guide pan having an inner width equivalent to the width of said belt, said guide pan being attached to said frame below said dual knife-edge plate member wherein said belt is guided through the corresponding U-shaped guide pan thereby keeping the belt in its respective location.

4. The improvement according to claim 1, wherein said dual knife-edge plate member comprises a flat plate and a pair of knife edge guides, each of said knife edge guides being attached at opposing edges of the flat plate along the width of the flat plate, each of said knife edge guides having a flat upper portion that extends a short distance beyond said edges of the flat plate and lies in the same horizontal plane as the flat plate, said knife edge guides further having a small radius at an outer edge thereof for allowing said transfer belt to deflect around.

5. The improvement according to claim 1, and further including a rotating circular cleaning brush, said cleaning brush being attached to the conveyor frame below said deflection pulley wherein bristles of said cleaning brush rotate in a direction opposite to the direction of the transfer belt and come into contact with said transfer belt thereby cleaning said transfer belt of any material deposited thereon.

6. The improvement according to claim 1, wherein said transfer belt comprises a thin flexible material.

7. The improvement according to claim 6, wherein said thin flexible material is polyester.

* * * * *